United States Patent [19]
Burnett et al.

[11] Patent Number: 5,459,860
[45] Date of Patent: Oct. 17, 1995

[54] COMPUTERIZED SYSTEM AND PROCESS FOR MANAGING A DISTRIBUTED DATABASE SYSTEM

[75] Inventors: Colin J. Burnett, Sydney, Australia; Garry L. Haas, San Jose, Calif.

[73] Assignee: International Business Machines Corporation, Armonk, N.Y.

[21] Appl. No.: 956,947

[22] Filed: Oct. 5, 1992

[51] Int. Cl.$^6$ .................................................. G06F 17/30
[52] U.S. Cl. ...................... 395/600; 395/650; 395/145; 364/974.7; 364/282.1; 364/242.94; 364/280.6; 364/DIG. 1
[58] Field of Search ................................. 395/600, 200, 395/650

[56] References Cited

U.S. PATENT DOCUMENTS

| | | | |
|---|---|---|---|
| 4,937,760 | 6/1990 | Beitel et al. | 364/513 |
| 5,117,351 | 5/1992 | Miller | 395/650 |
| 5,212,787 | 5/1993 | Baker et al. | 395/600 |
| 5,257,366 | 10/1993 | Adair et al. | 395/600 |
| 5,278,978 | 1/1994 | Demers et al. | 395/600 |
| 5,280,613 | 1/1994 | Chan et al. | 395/700 |
| 5,291,583 | 4/1994 | Bapat | 395/500 |
| 5,297,279 | 3/1994 | Bannon et al. | 395/600 |
| 5,361,350 | 11/1994 | Conner et al. | 395/600 |

OTHER PUBLICATIONS

Korth & Silberschatz, *Database System Concepts*, McGraw–Hill, (New York, 1986) pp. 45–105.
D. H. Fishman, "An Overview of the Iris Object–Oriented DBMS", *Compcon Spring 1988. Thirty Third IEEE Computer Society International Conference*, 29 Feb.–3 Mar., 1988, San Francisco, Calif., pp. 177–180.
Hsiu–hsen Yao, "The Dual Lattice Relational Data Model. An Approach for Managing Compound and Complex Data Types", *Proceedings. Advanced Computer Technology, Reliable Systems and Applications. 5th Annual European Computer Conference CompEuro '91*, 13–16 May, 1991, Bologna, Italy, pp. 735–739.
Chung et al., "A Heterogeneous Distributed Database System Based On Extended Relational Model", *Proceedings. ICCI '92, Fourth International Conference on Computing and Information*, 28–30 May, 1992, Toronto, Canada, pp. 338–341.

*Primary Examiner*—Thomas G. Black
*Assistant Examiner*—Paul R. Lintz
*Attorney, Agent, or Firm*—Sterne, Kessler, Goldstein & Fox; Marilyn Smith Dawkins

[57] ABSTRACT

In a distributed data processing system comprising a plurality of different computer systems, each system having a central processing unit (CPU), memory, a database stored in the memory, and a DBMS, a computerized method is provided for generating a plurality of objects in a standardized format. A unique object identifier is associated with each of the plurality of objects. Each unique object identifier is stored in memory in association with at least one object location type or instance, an object generation specification for each object location type or instance, and a generation specification type. For a requested object type at a specified location, identifying from the computer memory an object generation specification, and a specification type. The requested object is generated in a standardized format from the specified location using the identified process type and the identified object generation specification.

18 Claims, 10 Drawing Sheets

| OBJECTIVE IDENTIFIER | LOCATION | GEN-TYPE | GEN-SPEC |
|---|---|---|---|
| 1 | parisvm3 | Sql | select esn,dept from .. |
| 1 | mvs | Sql | select empno,dept from .. |
| 1 | 400 | Sql | select empno,dno from ... |
| 1 | vm | Sql | select empno,dptno from ... |
| 1 | os2 | Sql | select empno,dnoid from ... |
| 1 | | Sql | select empid,dnoid from ... |
| 2 | | Pgm | PAYROLL2 (parm1,parm2) |
| 3 | mvs | Sql | select dept,mgrno from ... |
| 4 | | Def | 408-555-1212 |
| ... | | | |

| OBJECTIVE IDENTIFIER | LOCATION | GEN-TYPE | GEN-SPEC |
|---|---|---|---|
| 1 | parisvm3 | Sql | select esn,dept from .. |
| 1 | mvs | Sql | select empno,dept from .. |
| 1 | 400 | Sql | select empno,dno from ... |
| 1 | vm | Sql | select empno,dptno from ... |
| 1 | os2 | Sql | select empno,dnoid from ... |
| 1 |  | Sql | select empid,dnoid from ... |
| 2 |  | Pgm | PAYROLL2 (parm1,parm2) |
| 3 | mvs | Sql | select dept,mgrno from ... |
| 4 |  | Def | 408-555-1212 |
| ... |  |  |  |

FIG. 4

TOOLOUT:

| RC | NBR_ITEMS | ITEM_RAY |
|----|-----------|----------|
| φ  | 5         | (ptr)    |

| DATA_TYPE | NULL_IND | DATA_LEN | DATA_PTR |
|-----------|----------|----------|----------|
| 452       | 0        | 137      | (ptr)    |
| 453       | 0        | 23       | (ptr)    |
| 500       | 0        | 2        | (ptr)    |
| 448       | 0        | 16       | (ptr)    |
| 496       | 0        | 4        | (ptr)    |

*FIG. 5*

A) GENERATOR TEXT :

150 — 151, 152
SELECT '!location', NAME, CREATOR
FROM SYSIBM.!table
WHERE — 154, 156, 158
175 — {index:NAME LIKE '!index'} AND
{user:CREATOR LIKE !user} AND
{view:NAME LIKE '!view'} — 160
ORDER BY {index: NAME} {view&index: ,} {view: CREATOR}

170 — 172, 178, 162
Qualifier Identifier : location
 table — 174      Values : R1 — 180
 user — 176              SYSVIEWS
 user — 176              'FRED' — 182
                         'RE*' — 184

161 — The generator after substitution is:
 SELECT 'R1', NAME, CREATOR
 FROM SYSIBM.SYSVIEWS
 WHERE ((CREATOR LIKE 'FRED') AND (CREATOR LIKE 'RE%'))
                                                          — 186 full name = R1.NAME.CREATOR
short name = none
messages = none

*FIG. 6*

| GENERATION SPECIFICATION TEXT | QUALIFIER IDENTIFIER | QUALIFIER VALUE | RESULT |
|---|---|---|---|
| !2 | 2 | C | C |
| !3 | 3 | 'C' | 'C' |
| '!4' | 4 | C | 'C' |
| '!5' | 5 | 'C' | 'C' |
| !6 | 6 | "FRED.T1" | "FRED.T1" |
| {1&2: and} | 1 | A | AND X |
|  | 2 | B |  |
| {1&2: and} X | 1 | A | X |
| {1\|2: or} X | 1 | A | OR X |
|  | 2 | B |  |
| {1\|2: or} X | 1 | A | OR X |
| {1&2\|3: and/or} X | 2 | B | X |
| {1&2\|3: and/or} X | 1 | A | AND/OR X |
|  | 3 | C |  |
| A{1: +!1{2: +!2}}=D | 1 | B | A+B+C=D |
|  | 2 | C |  |
| A{1: +!1{2: +!2}}=D | 1 | B | A+B=D |
| A{1: +!1{2: +!2}}=D | 2 | C | A=D |
| A{1: +!1{2: +!2}}=D |  |  | A=D |
| {2: X='!2'} | 2 | A | ((X='A') OR |
|  | 2 | "B" | (X='"B"') OR |
|  | 2 | C | (X='C')) |
| {2&3: !2=!3} | 2 | A | ((A=a) OR |
|  | 2 | B | (B=b) OR |
|  | 2 | C | (C=c)) |
|  | 3 | a |  |
|  | 3 | b |  |
|  | 3 | c |  |

FIG. 7

Generator Text:

```
SELECT '!location', '.', CREATOR, '.', '#', NAME, '#'
FROM SYSIBM.SYSINDEXES WHERE
    {user:CREATOR LIKE '!user'} AND
    {source_collection&table:TBCREATOR LIKE
     '!source_collection' AND TBNAME LIKE '!table'}
```

Qualifier Identifier : rdbname     Values : R1
                  source_rdbname      R1
                  source_collection    FRED
                  table                T1
                  location             RbdNew
                  user                 U1

The following SQL statements are executed to generate the object occurrences :

```
CONNECT TO R1

SELECT 'RdbNew', '.', CREATOR, '.','#', NAME, '#'
FROM SYSIBM.SYSINDEXES
WHERE (CREATOR LIKE 'U1') AND
      (TBCREATOR LIKE 'FRED' AND TBNAME LIKE 'T1')
```

The object occurrence format is
full name = 'RdbNew'.CREATOR.NAME

FIG. 8 e) Generator Text (Bufferpool Auths)

320 {
SELECT USEAUTH, '.', GRANTEE, '.', '!53', '.', NAME, '#', '#',
    '3333I', NAME, GRANTEE, USEAUTH
FROM SYSIBM.SYSRESAUTH  /—324
WHERE {13: NAME LIKE '!13'}
AND   {5: GRANTEE LIKE '!5'}
ORDER BY NAME, GRANTEE

Qualifier Identifier : 23 (rdbname)    Values : R1
                      53 (location)            R1
                      13 (buffer pool id)      BP*
                       5 (userid)              FRED  /—327

The following SQL statements are executed to generate the object occurrences :

/— 326
CONNECT TO R1

325 {
SELECT USEAUTH, '.', GRANTEE, '.', '!R1', '.', NAME, '#', '#',
    '3333I', NAME, GRANTEE, USEAUTH
FROM SYSIBM.SYSRESAUTH
WHERE NAME LIKE 'BP*'
    AND GRANTEE LIKE 'FRED'
ORDER BY NAME, GRANTEE

Assuming that FRED has USE authority on BPI and BP32K, the following will be the results:

full name (up to second #): Y.FRED.R1.BP1
                            Y.FRED.R1.BP32K short name (between first and second #): NULL 332 — message line (assuming 3333I is "&1    \t&2    \t&3"):

*FIG. 9*

COMPUTERIZED SYSTEM AND PROCESS FOR MANAGING A DISTRIBUTED DATABASE SYSTEM

FIELD OF THE INVENTION

This invention relates to computer systems having database management systems for storing, organizing and retrieving data. More particularly, this invention relates to managing a distributed database management system (DBMS) interconnecting different types of database management systems.

BACKGROUND OF THE INVENTION

In a dynamic business environment, where timely access to data is important, computerized databases are commonly used to store data for easy retrieval and organization. The data is stored electronically in mass storage devices. Several computer software programs collectively called a database management system are used to manipulate the data for retrieval, deletion, updates and storage.

One type of DBMS used by many enterprises is a relational database management system (RDBMS). An RDBMS is a body of related information stored in a computer organized as tables having columns and rows. The columns correspond to attributes of relations and rows correspond to a relation grouping called a tuple. For example, an inventory table could have attributes such as an inventory item number, a description of the item, a quantity in stock, a price and a supplier. Each column corresponds to an attribute and each row is a tuple comprising the attributes for a given item.

Large enterprises with many remote business locations frequently have data stored at each separate location. For example, a large retail business having numerous outlets many miles away from each other could have separate databases at each location keeping track of that store's inventory. The local databases are accessible by local sales staff for information about items in stock locally. However, central purchasing staff for the business also need to access the information regarding each store's inventory.

The databases at each location can be linked together through communications systems so that the databases can all be reached from a central location. A distributed relational database network consists of a collection of tables spread across a number of computer systems having the same or different types of DBMSs that are interconnected in a network. Each computer system in the network has its own DBMS to manage data locally stored in its environment. Each of the remote locations may be using one of many different DBMSs that are currently available. These DBMS types and each version release thereof have different features and functionalities.

Accessing data from remote locations can be difficult for both database users trying to retrieve information from databases and for programmers creating programs using the data. It is even more difficult to access data at a remote location which has a different DBMS.

For large enterprises having many remote locations with different DBMSs, a programmer has to know many different DBMS commands, syntax and structure to access or control access to data at each remote site. Also, to perform correctly, the resulting programs must be designed and built to take into account the differences and special abilities of each remote system, the database system types that are on each system, the databases, contents of each database (e.g., tables and table columns) and the authorizations allowed for each part of each database.

The database type, the database, and the authorization are termed object types, while the actual databases stored in the systems, the tables in the database, the columns of the tables, and the authorizations on each table and column are termed occurrences or instances of a system object type. Materialization of objects refers to the process of creating a representation of the object by, for example, retrieving or organizing data in memory. The programmers need to know the object types in a system, the object occurrences, the relationships between objects, the actions that can be performed on a given object, and the way objects are materialized, for each of the systems in the network.

The programmers especially need to be cognizant of the differences in processes to generate lists of object occurrences in each system type. When each computer system has its own unique command set and syntax, there is an even greater need for a programmable process to control and facilitate the addition of new object types, relationships, and occurrence generators for all of the different systems.

Therefore, there is a need for a standardized method of retrieving all of the various objects in a distributed database system. It is important for such a method to be table or control file driven and to be dynamically extendable to provide for future additions of new objects and the relationships between objects being managed by the system.

There is also a need for flexibility in the design of the control tables used by the system managing a distributed database system. The distributed system is continually being changed to contain new object occurrences or instances (such as a particular table), object types (such as a new type of authorization privilege), and relationships between object types and the actions to be performed on object occurrences (such as copying, adding or deleting objects). Prior programming methods of encoding algorithms for obtaining entity-type and entity-instance relationships and the related program functions to perform various actions on the object instances or occurrences have typically required the creation of specific purpose code which is unique to the relationship of entities, the entity-type or the instance materialization technique. Traditionally, the specialized code is embedded in each program that processes that entity or object. For example, it is common practice to embed within a program module, the programming algorithm necessary to locate entity-to-entity relationships, determine methods of materializing specific instances of the relationship, call methods of materializing specific to instances of the entities, and optionally providing for addition of new object types and actions. This practice results in duplication of effort when the entities are involved in multiple solutions as occurs in managing a distributed system. Therefore, for managing a distributed system, there is a need for providing a standardized object list retrieval system that is decoupled from object instance utilization functions such as display routines.

SUMMARY OF THE INVENTION

It is an objective of this invention to place information regarding the logic of generating object occurrences and object relationships into tables rather than embedding the logic information in the generation code.

System objects and relationships are changed or added by changing table entries instead of having to change the process itself. Object and relationship definitions and materialization specifications are stored and processed outside the operational scope of the process which requires that information about the object instances or relationships be returned. It is an objective of this invention for the requesting process to be unaware of differences in materialization techniques (which may vary from day to day or from environment to environment) used to generate the information.

It is a further objective of this invention to provide a process for materializing or generating information about an indeterminate number of programming object types using an indeterminate number of methods of materialization which are distributed across an indeterminate number of materialization sites. The information is returned to the requester in a standardized structure.

In a distributed data processing system comprising a plurality of different computer systems, each system having a central processing unit (CPU), memory, a database stored in the memory, and a DBMS, a computerized method is provided for generating a plurality of objects in a standardized format. A unique object identifier is associated with each of the plurality of objects. Each unique object identifier is stored in memory in association with at least one object location type or instance, an object generation specification for each object location type or instance, and a generation specification type. For a requested object type at a specified location, an object generation specification and a specification type are identified from the information stored in the computer memory. The requested object is generated in a standardized format from the specified location using the identified process type and the identified object generation specification.

In a preferred embodiment, the object is materialized using a standard return format where information pertaining to the object is retrieved as 0 to n data rows. One occurrence of the standardized information is represented per data row. The information in each row exactly follows the format defined for that object's information, but need not follow the format for any other object. The object is generated (materialized) by one or more generating routines or processes, depending on generating environment and is conditionally generated, depending on the presence of and values for parameters (qualifiers) passed to the materializing routine(s). Because of the variability of the presence of the parameters passed to the materializing routines, there is a variable resulting "standardized" object format.

Many of the generating (materialization) processes/routines are shared (used) by more than one object definition as appropriate, and linked to the object definition from other object definitions. A requester routine identifies an object identifier, provides any required and/or optional parameters for the object, specifies a return area in which the standardized information is to be returned, and then calls the routines to retrieve the object. Unlike common Object Oriented Programming practice, the code to generate the object instance list is not internal to the object, but is instead external to the object although it is not known to the requestor. The generation routines are "externalized" to the point that multiple objects can share the generating routines. Since the requestor does not "own" or "contain" generating routines, the routines can be modified or replaced with minimum impact to all the users of the routines. Only the format of the returned data is required to be constant (even though it can vary as a result of the passed parameters). Also, since the object(s) may exist in several different operating environments (such as the IBM operating systems VM, MVS, AS/400, OS/2), different generation routines may be required accordingly. However, the invention masks the fact that different generators may be required (and the fact that the generators may be executing in different operating environments), so the amount of environment-sensitive coding effort in the requestor is reduced accordingly.

DETAILED DESCRIPTION OF THE INVENTION

Figure 1:
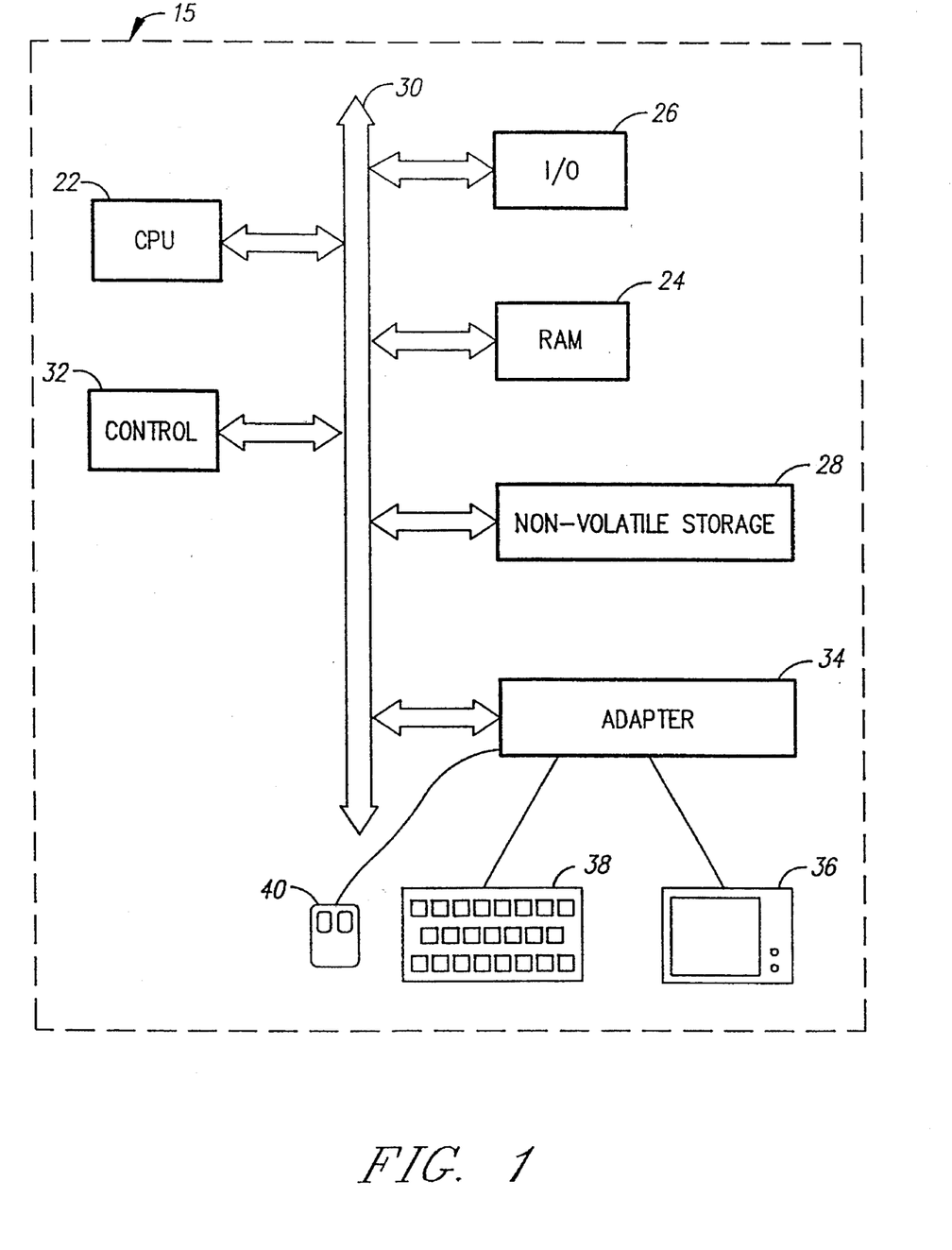
FIG. 1 is a detailed schematic diagram of a computer system.

FIG. 1 shows a data processing apparatus 15 with which the present invention may be practiced. The apparatus 15 comprises a central processing unit (CPU) 22, a random access memory (RAM) 24, input/output (I/O) port 26 and nonvolatile storage 28 such as disk storage or read only memory (ROM), all connected to a common bus structure 30. The CPU runs or executes programs that are stored in the memory (either the RAM or the nonvolatile storage). Control circuitry 32 performs housekeeping operations such as providing appropriate clock signals and controlling the operation of the bus 30. An adapter 34 may be used to interface to other components that interact with a system user such as a visual display unit or terminal 36, and user interaction devices such as a keyboard 38 and a mouse 40. The implementing environment also includes what is called a window, display screen, or view port which provides means for displaying rows of data and other information to the user. The general purpose data processor 15 shown in FIG. 1 can be used to perform the invention under the program control outlined in the flowchart of FIG. 3.

Figure 2:
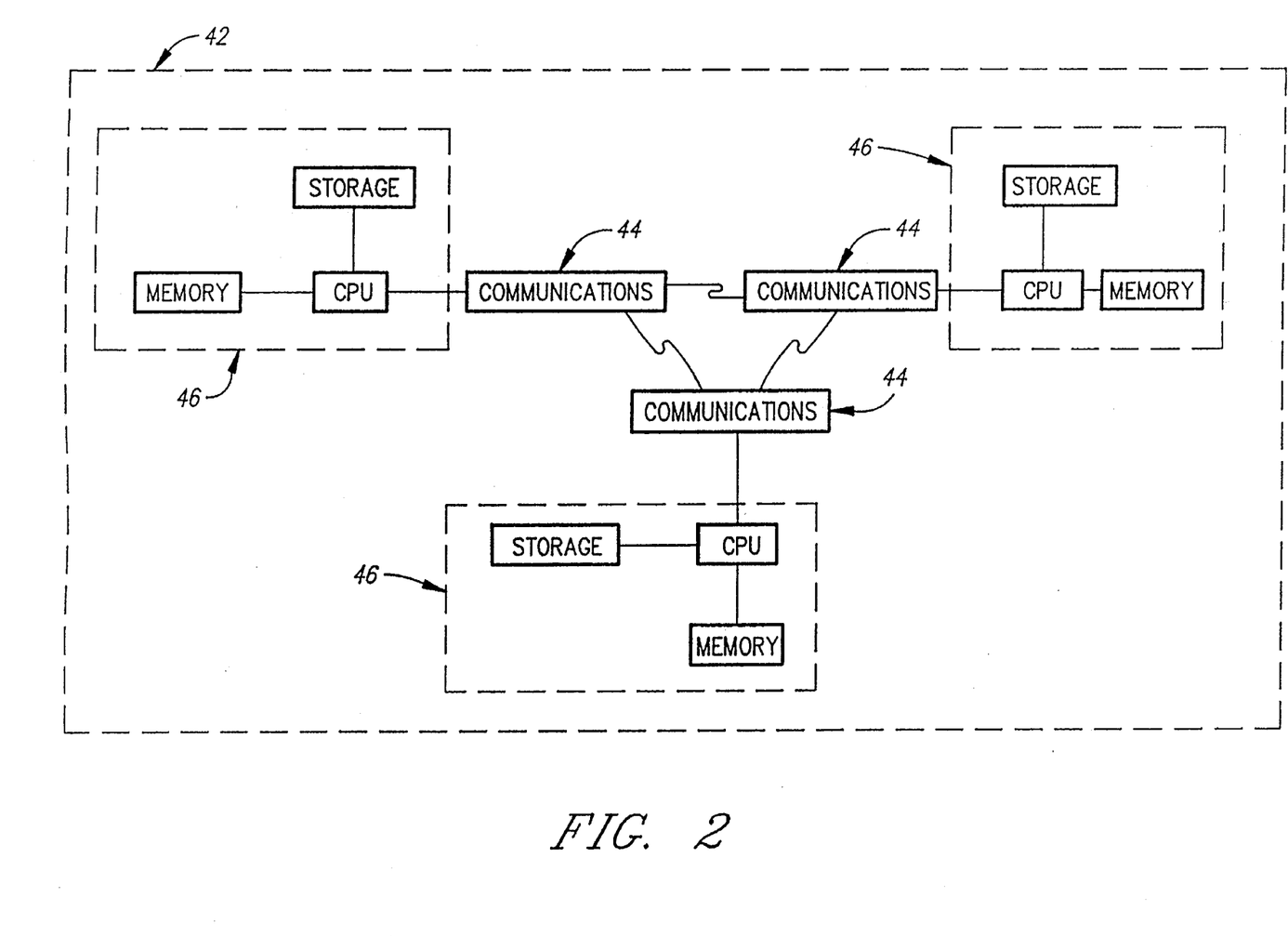
FIG. 2 is a schematic diagram of a distributed data processing system.

FIG. 2 shows a distributed data processing system 42 where a communication system 44 is used to interconnect a plurality of computer systems 46. Each computer system 46 is similar to the system shown in FIG. 1 and has one or more databases stored in the nonvolatile storage and one or more database management system (DBMS) programs run by the CPU to manage the databases. The DBMSs can be different types of DBMSs (including RDBMSs) with different commands and syntax. In the preferred embodiment the distributed system is managed from a programmable work station. However, the system can be managed by any of the computer systems. The invention can also be used for a single computer system that is not part of a distributed system.

An object is anything that can be represented as a condition, a state, an occurrence or a relationship and can be represented by one or more lines in a list processed for programs or displayed on a display screen. Included in this definition are: output from SQL queries, the SQL query itself, a host system name, a program status (such as pending states), the output of a program (such as OS/400 authorization returned from a host), and a condition such as a lock on an entity.

In developing programs to manage the distributed database system, programmers need to create (materialize) objects relating to the system in order to copy, delete, add data items or authorizations between systems or determine program or system status.

This invention provides an automated standardized method for generating a large number of different system objects in a variety of ways. In the preferred embodiment, there are three types of object generators. Objects can be generated that are defined by a generation specification, generated through the execution of a generation specification that is an SQL statement, or generated through the execution of a generation specification that is a program. The three types of generators are called, respectively, "Defined", "SQL", and "Program" generators. The generation specification text is stored in association with an identifier for the object. The object is generated by identifying the generation specification text for the object, determining what type of generator is used for the object generation and processing accordingly (executing the SQL statement or program or using the specification text itself as the object). The generation specifications can be used to generate more than one object. Additional flexibility is achieved by incorporating qualifier identifiers in the specification text where the program requesting the object supplies the qualifier substitution values.

Figure 3A:
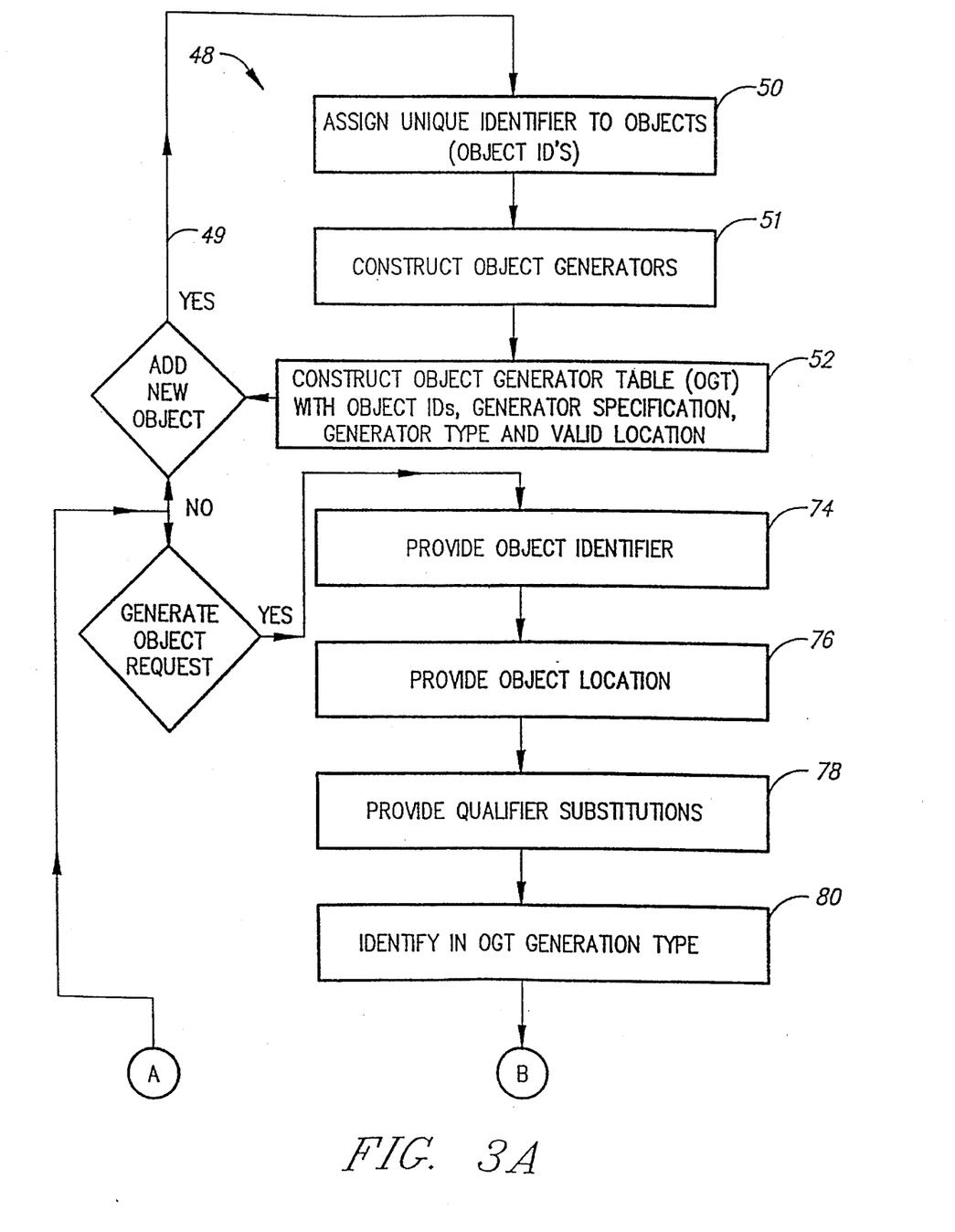
FIG. 3 is a flowchart of the invention.
Figure 3B:
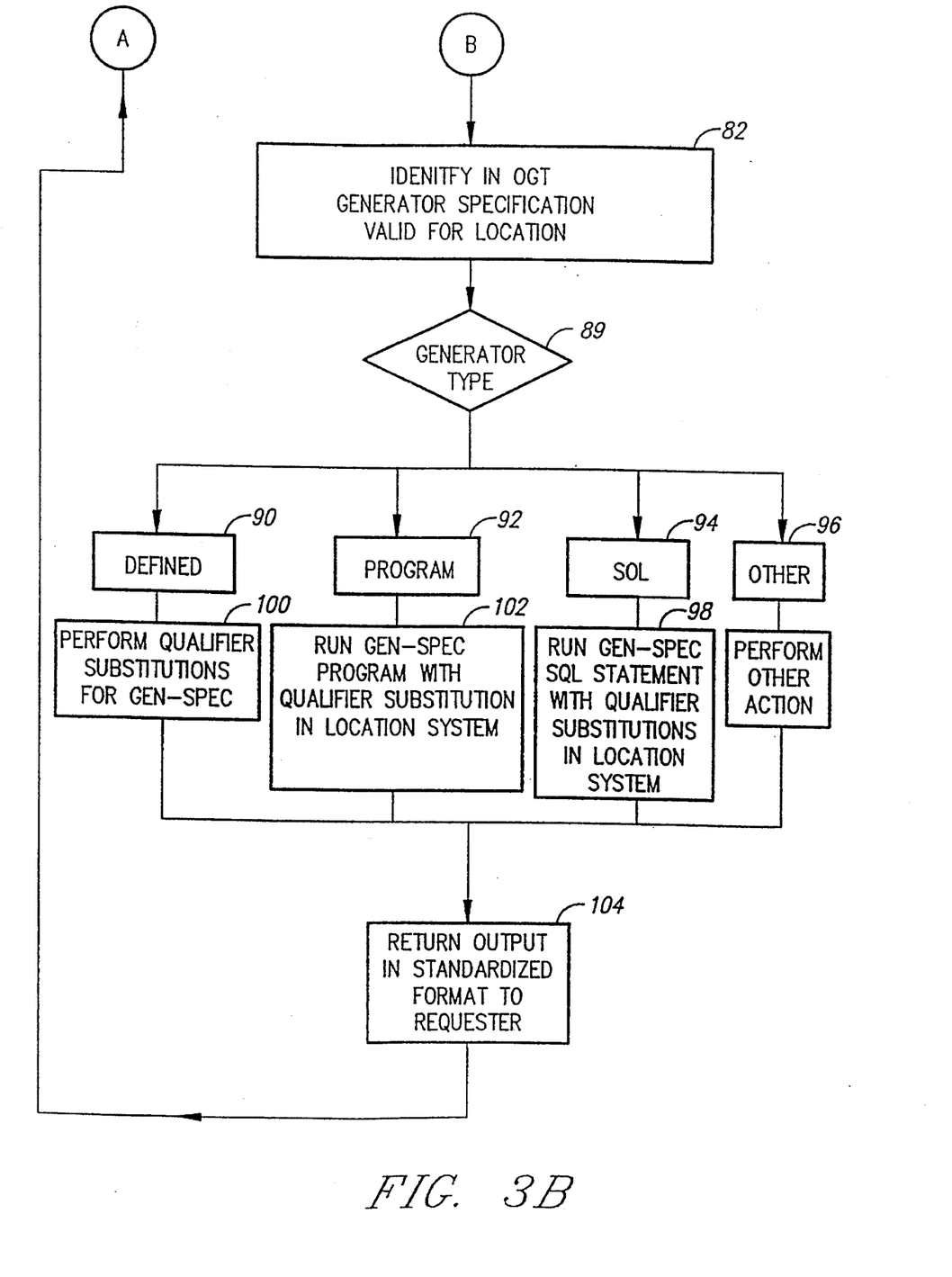

Referring to FIG. 3, the first step in the computerized process for standardized generation of different objects is to build an object generator table which provides the mapping of the objects to the object's generation specification and generator type 48. The table is also updated as needed with new objects and object generation specifications 49. All that is required is that the object be assigned a unique identifier 50, an object generator is constructed 51 and the information is added to an Object Generator Table 52.

In order to build the table, a large number of system objects, useful in distributed database management programs, are assigned a unique identifier 50. Some objects are used in the management of the DBMS and other objects represent user data entities such as tables, views and indexes. The generation specifications for generating the objects are also created. For objects that are generated using programs, the programs are created and the specifications for generating the objects are the respective program names. For objects that are generated using SQL statements, the SQL statements are created and the specifications for generating the objects are assigned respective SQL statements. For objects that are defined by the specification, the specifications are assigned the respective definition. In that way, the generation specifications and associated programs or sets of instructions for generating objects are created for each object 51. A table entry is created in the Object Generator Table for each object to provide information on generating the object 52, including the object identifier, the object generation type, and the generation specifications. More than one generation specification can be used to generate an object depending on the location type or instance associated with the object generation because of the different syntaxes of the DBMSs and operating systems of the various computer systems in the distributed system.

The objects that are generated depend on the qualifier identifiers that are provided by the requesting program. For example the same SQL statement can produce an "object" consisting of a list of tables for which a particular user ID is authorized or an "object" consisting of a list of table columns for which a different user ID is authorized. These object instances can be considered the same object and have the same object identifier. The same "object" could also be generated using different generation specifications where the syntax for the SQL statements used to generate the object differs for a different system.

In the preferred embodiment, requests for objects originate from program routines. The objects can be displayed on a display device or used by other programs. A routine requesting an object calls the generating routines to automatically coordinate the generation of the object, and identifies the object identifier 74, provides any required or optional parameters (qualifier values) for the object 78 including the object location 76, and specifies a return area in which the standardized object is to be returned (by the generator routines).

The object identifier is used as a key to the Object Generator Table entry which contains the value for the corresponding generator type 80. The object identifier and location parameter are used to identify the object generator that is valid for the requested object at the requested location 82.

The way the generation specification is processed depends on the generator type 89 (Defined 90, Program 92, SQL 94 or Other 96). For the Defined and SQL types of generation specifications, qualifier substitutions need to be made using qualifier values supplied by the requester. For the SQL generator, the qualifier identifiers are substituted into the generation specification to produce an SQL statement that is run by a DBMS 98. For the Defined generator, the substitutions provide the object 100. For the Program type generators, the specification is a program name to be executed by a CPU to produce the object and qualifier values are used as parameters passed to the program. The parameters are used by the program to qualify the definition of the object 102. The output from the the generators is placed in a standardized format and returned to the requesting routine 104.

Figure 4:
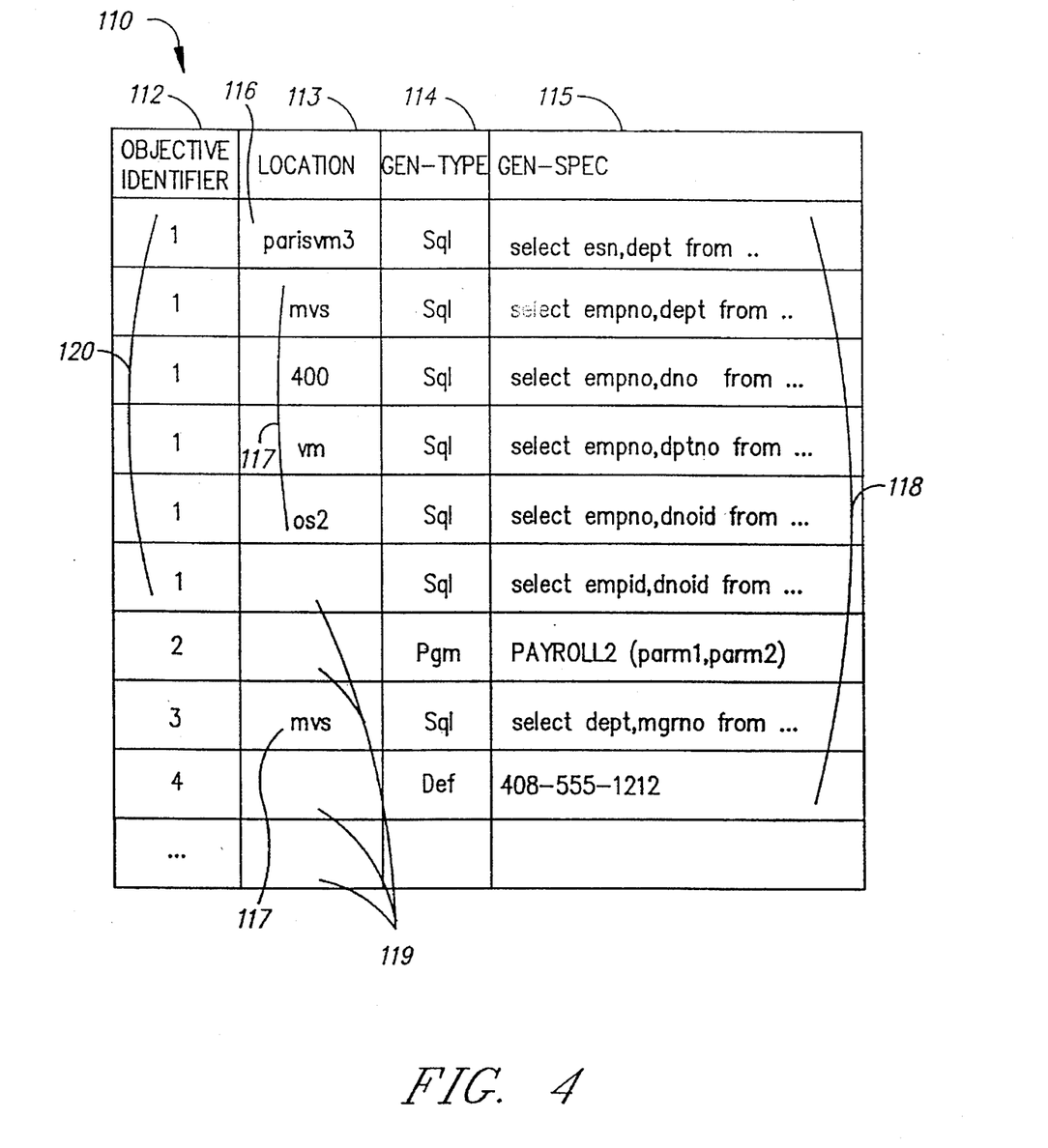
FIG. 4 is an object generator table.

Referring to FIG. 4, the information for generating an object is provided in the Object Generator Table 110 by the attribute columns: OBJECT IDENTIFIER 112, LOCATION 113, GEN-TYPE 114 and GEN_SPEC 115. The OBJECT IDENTIFIER attribute references the object. The LOCATION attribute identifies the specific location 116 or location type 117 where the object generation specification 118 is valid. When the location attribute is blank 119, the corresponding generation specification is valid for all location types and instances. The GEN-TYPE attribute identifies the type of generator used to generate the object. The GEN-SPEC attribute contains the text for the generation specification.

The object identifier attributes can be repeated on multiple rows 120 where the corresponding location attributes are used with the identifier to determine the valid generation specification. Where there is no location attribute specified 119, the generation specification is valid for all locations. Where the table contains multiple entries for a single object identifier, the entries are sorted in order of increasing generality and only the first retry is used. So that, the first entry is for a specific system 116, the next is for a DBMS type 117, and the last is blank, for all other systems and database types.

The process by which the generation specification is used is determined by the attribute value for the GEN-TYPE in the same row. In the portion of the Object Generator Table shown in FIG. 4, the first object 120 is generated by SQL statements which are specific to a location instance 116 or location types 117 or not specific to any location 119. The GEN-SPEC for the first object contains the text for an SQL statement. The second object is generated by a program where the generating program name (PAYROLL2) is listed in the GEN-SPEC field. The fourth object is has a Defined generator type. The object itself is a phone number (which could be the phone number for the computer system operator).

The object generators are either directly listed in or referenced by the table generation specification. For defined generators, the GEN-SPEC field contains the actual object occurrence definition itself. That is, the generated object is the defined generation specification (after qualifier identifier substitutions are made). For the SQL generators, the GEN-SPEC contains the SQL statement to be run (after qualifier identifier substitutions are made) by a DBMS. The object occurrence list that is generated is the output from the SQL statement. For the program generators the GEN-SPEC contains a program name. The program name refers to a previously written program requiring input parameters as appropriate. The output from the program after execution by a CPU is the object occurrence list. The object occurrence list produced from the Defined, SQL or program generators are output to the requesting program.

The various location operating systems and DBMSs can use different commands and syntax requiring different generators to be used for different locations. An advantage of this invention is that the programmers requesting the objects do not have to be proficient in each system's operating system and DBMS.

A preferred embodiment of the data structure definition 130 used to contain the returned lists of materialized information from the generators will be described with reference to FIG. 5. The structure is consistent for all objects, but is self-defining so that different objects can take different forms (i.e., can consist of a different number of attribute values, columns, data strings, etc.). The returned data structure is referred to as the TOOLOUT structure.

Figure 5:
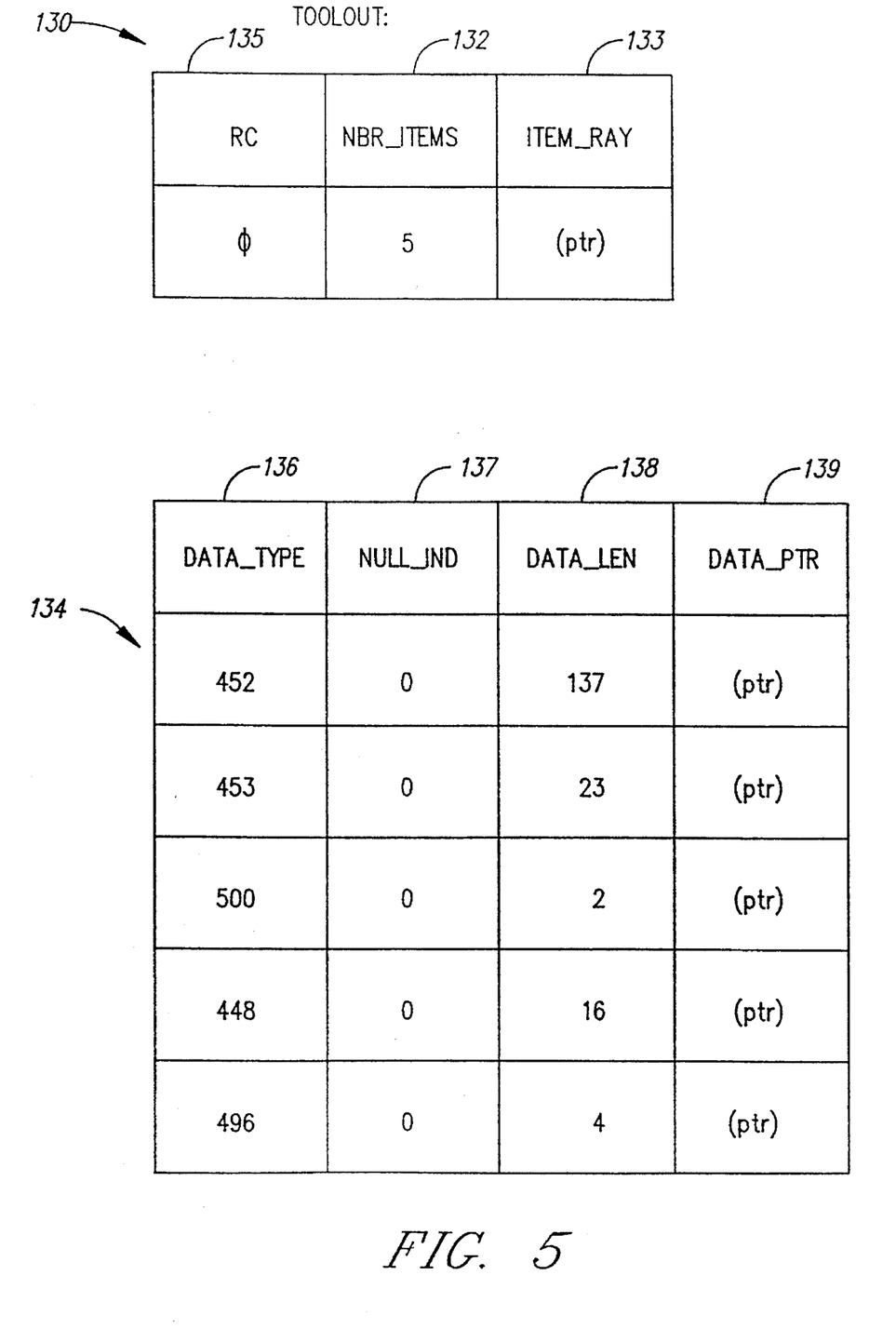
FIG. 5 is a data structure definition for returning lists of materialized information to a requester.

Referring to FIG. 5, there are two values NBR_ITEMS 132 and ITEM_RAY 133 that are returned by the object generator. ITEM_RAY is the address of a returned array 134. NBR_ITEMS is the number of entries in the returned array.

There is also a return code 135 that is returned by the object generator. The return code identifies whether the object was successfully generated and if not, it provides information as to what was wrong. That is, the return code indicates whether there was an invalid identifier, incorrect qualifier, whether the generator failed, or whether the object is null. When the generator fails or no values are returned but the generator completed without error (e.g., the SQL statement retrieved no responses), the NBR_ITEMS is zero and the ITEM_RAY has a null value. The return codes provide the requesting routines with information on the reason for there being no output.

Referring to the returned array 134, DATA_TYPE 136 is an encoded data type. In the Date_Type column, the code 452 is Character, fixed length, not nullable; 453 is Character, fixed length, nullable; 500 is 16-bit signed integer, not nullable; 448 is Character, varying length, not nullable; and 496 is 32-bit signed integer, not nullable. There are other designations to represent all appropriate data types. NULL_IND 137 indicates whether the data value is null or not. NULL_IND has the value "0" when the data value is not null, "−1" when the data value is null, and ">0" when the data Value is not null but was truncated. DATA_LEN 138 is the length of the data for that row. DATA_PTR 139 is a pointer to the data for the object occurrence of that row. An object that is the result of an SQL query will consist of a table of information. Each row from that table (an occurrence) is stored in a row of the returned array.

Many other TOOLOUT structures can also be used. Other data elements that can be included in a TOOLOUT structure are CCSID numbers, serviceability "eye-catchers" and product names/codes.

Before a Defined or SQL object generation specification is used to generate the object occurrences, it is processed for conditional text and parameter substitution. This is done by comparing the qualifier identifiers passed as input to those contained in the text of the object generator. Where a match is found conditional text is included in the object generator and the qualifier values associated with the qualifier identifier are incorporated into the object generator.

Generation specifications of up to the system table limit capacity (typically 4000 bytes) can be stored directly in the table. Otherwise, Generators of any length can be specified in a file.

The PROGRAM Generation specification for the program name to be executed must include the full path name or the program should reside in a directory in the "path" for the session. The program can then either generate the object directly or call other programs either locally or remotely to generate the object.

Program generators are called with the following arguments: A pointer stored in memory to a public parameters block (called PUBLICPARAMS), a pointer to a tool input area (TOOLIN), and a pointer to a tool output area (TOOLOUT).

The public parameters block is an area of memory which has been arbitrarily mapped into a structure which contains various data values, pointers, other structures and possibly input and/or output areas. The tool input area is an area of memory containing the input parameters, arguments and data values (such as the object identifier) required or usable by the program. The tool output area is an area of memory where the program returns the list of occurrences. The tool output area is updated by the program to contain the returned object occurrences list. The object occurrences to be returned must be returned in the tool output area as new occurrences since the TOOLOUT structure is initially empty.

The program generators returns a code which indicates whether the process was successfully completed. Program generators can return the following return codes in the tool output structure: OK—normal completion; GENERATOR_FAILED—error in executing the generator; and NO_OCCURRENCES—no object occurrences which satisfy the supplied qualification were found; and other return codes as described in more detail below.

An example of a program generation specification is C:\GENER.EXE. The program GENER.EXE accepts parameters such as RDB-name and year. As an example, the values for the parameters are SYDVM1 and 1990. The qualifiers are put in a tool input structure and the program is invoked and passed pointers to PUBLICPARAMS, TOOLIN and TOOLOUT to return the results. All the memory for these structures and data areas is in the shared memory. If values for the program parameters (in PUBLICPARAMS) is located at memory address 3333333333, the program tool in (in TOOLIN) is located at memory address 5555555555, and the program tool out (in TOOLOUT) is located at memory address 8888888888, (where all addresses are expressed as a decimal string equivalent of the actual memory address and the present implementation requires these addresses to be in the range of 1 to 2^-1) then GENER is invoked as a child process with the following arguments: "C:\GENER.EXE 3333333333 5555555555 8888888888".

The Defined generators are treated as a text string only. The generator can be a SQL statement but if so it will not be executed as SQL. The text string will be parsed for substitution parameters, any matching substitution parameters will be replaced with the values supplied by the requester, unmatched substitution parameters will be "pruned", and the resulting string will be returned to the caller, along with a return code to indicate success/failure of the call. SQL generators are parsed similar to the Defined generators, but are also executed as SQL statements.

Figure 6:
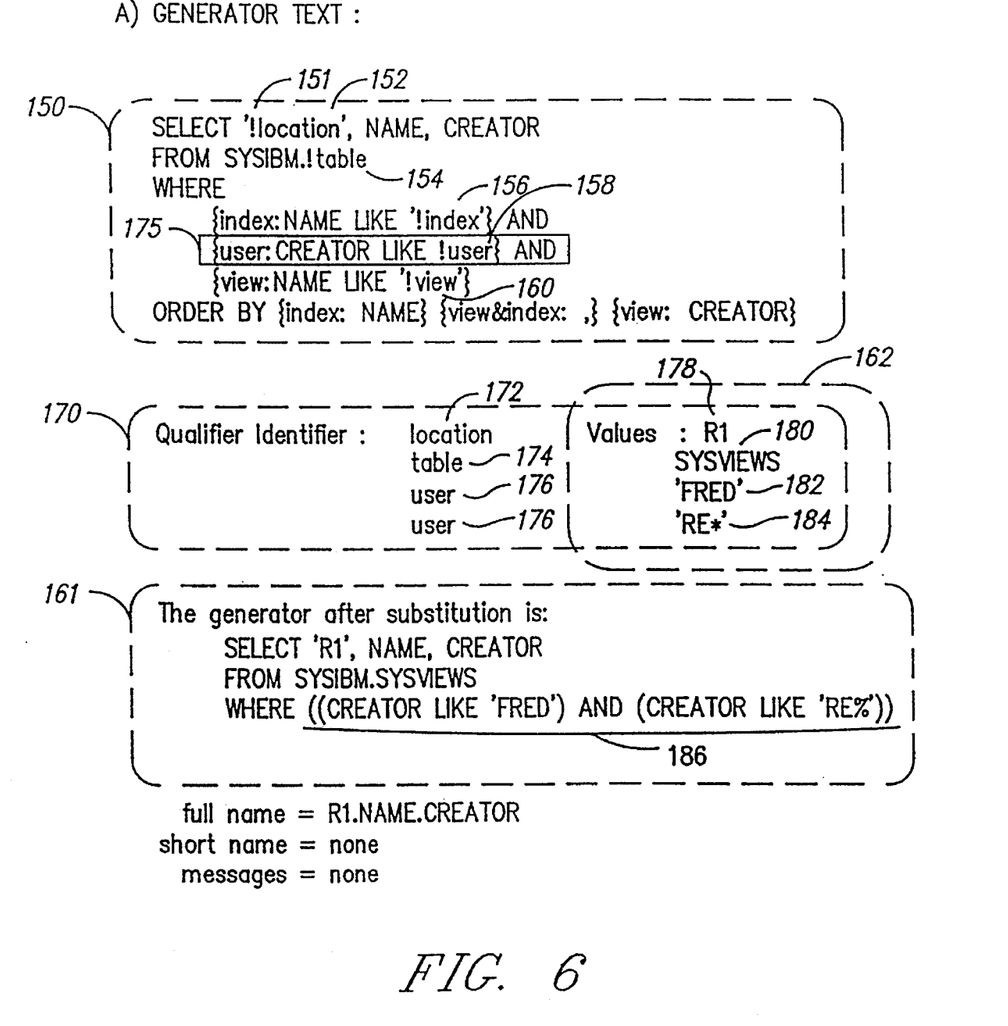
FIG. 6 is a table showing parameter substitution schemes.

An example of the parsing substitution is explained with reference to FIG. 6. FIG. 6 is an example of a generation specification of a Defined or SQL object (the difference being whether it is executed as SQL—which is determined by the object's generator type value).

For ease of illustration, uppercase characters are used for the unsubstituted text values and lowercase characters are used to represent names of substitution parameters. The method is actually case insensitive.

Referring to the generation specification 150, the parameter arguments are sometimes preceded by an an exclamation point ("!") 151, for example, location 152, table 154, index 156, user 158 and view 160. This indicates to the substitution routine that the values supplied for the respective input parameters are to replace the "!" and parameter argument. Thus, referring to the result after substitution 161, the resulting data string does not contain any "!"'s or parameter argument names, only substituted data values from the passed values list 162.

There are also occurrences of data strings which are enclosed in braces "{}". Each such string is a conditional text string which will be pruned (discarded) if certain test conditions are not met (i.e., result in a FALSE result). The test condition is initially assumed to be TRUE, but will be set to FALSE if an optional test specification at the front of the enclosed string results in a FALSE result when evaluated. The test specification consists of one or more input argument names with optional AND, OR, and NOT operators separating them to comprise a Boolean expression terminated by a colon.

When the generation specification 150 is used with the passed input parameters shown as 170 where input parameter arguments passed are location 172, table 174, and user 176, and the respective data values for the parameters are R1 178, SYSVIEWS 180, FRED 182 and RE* 184. Note there are two data values 182, 184 for the argument name USER 176. This indicates that for substitution purposes conditional clauses 175 which use the argument USER 176 are to be repeated as many times as there are values 182,184 for the argument name USER 176 in qualifier identifier parameters passed to the substitution routine 186.

Figure 7:
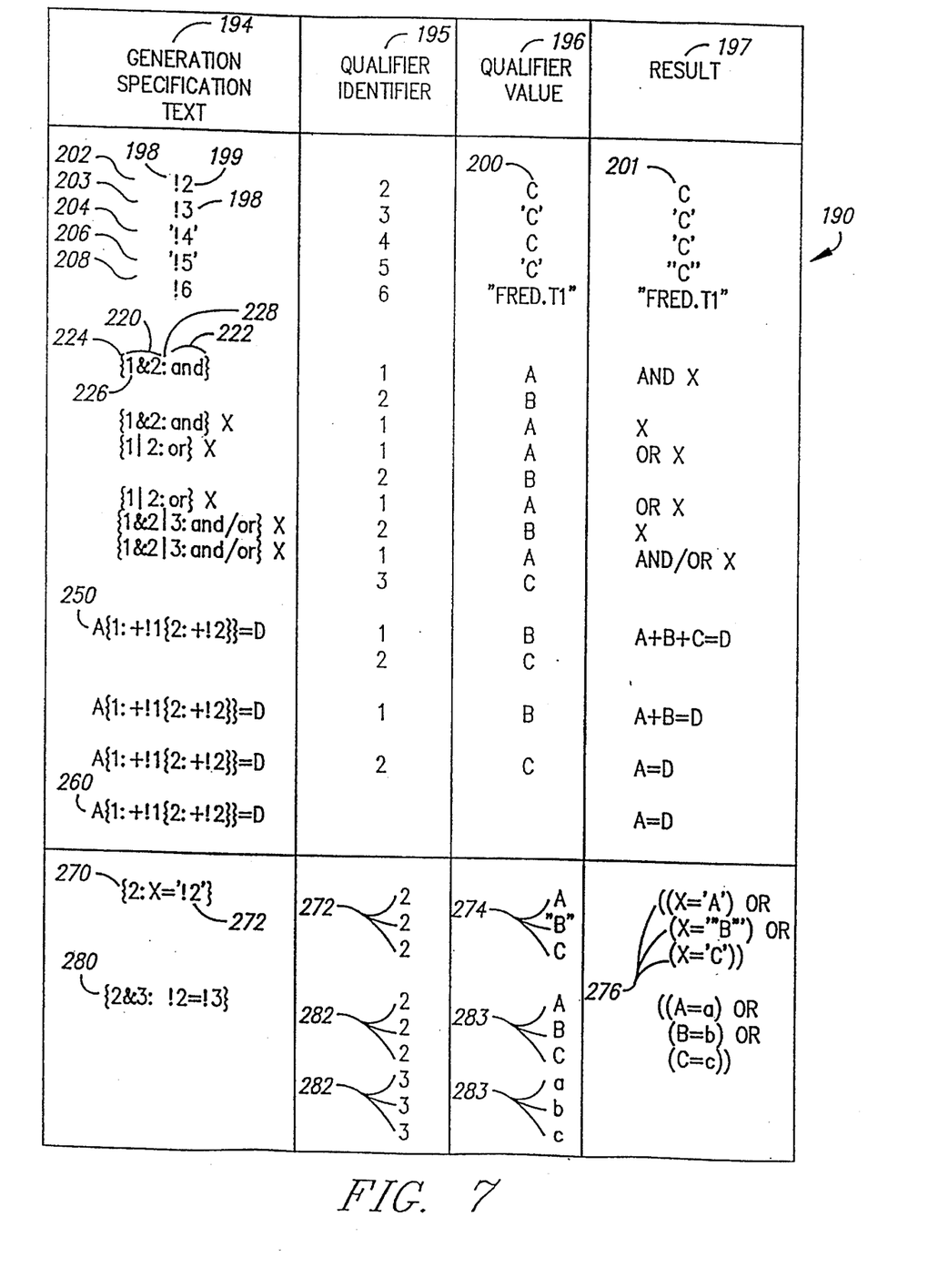
FIG. 7 is an example of a Defined generation specification.

Procedures followed for parameter substitution are further clarified with references to the parameter substitution examples shown in FIG. 7. The chart 190 in FIG. 7 shows portions of text from generation specifications 194, the qualifier identifiers 195, the values for the qualifiers 196 (supplied by the requester), and the resulting values 197.

The argument values to be incorporated into the text statement of the generation specification are indicated by "!" followed by a qualifier identifier which must match one of the qualifier identifiers passed as input. The "!" and qualifier identifier are replaced with the qualifier value and anything surrounding the qualifier is not changed (see 200–208). No additional formatting is done. If no match is found on the input, processing cannot continue and a return code of NO_VALUE_FOR_REQUIRED_PARM is returned with the empty TOOLOUT.

Conditional values 220 and text 222 are enclosed in braces {}. Following the opening brace "{" is a list of qualifier identifiers 226. The last qualifier identifier is followed by colon ":" 228. The qualifier identifiers are separated by a bar "|" (symbolizing the logical OR operation) or ampersand "&" (symbolizing the logical AND operation) and are evaluated from left to right. The conditional text 222 enclosed in braces {}'s 224 are only included in the generation specification when the qualifier identifier expression (preceding the colon) evaluates to TRUE. The presence of a qualifier identifier represents TRUE and the absence of a qualifier identifier represents FALSE. The use of parentheses to nest qualifier identifiers is not supported. However, the conditional clauses can be nested as shown in 250–260.

There are some special cases for qualifier substitutions that are used. For example, the asterisk character "*" in qualifier values is converted to a percentage character "%" because SQL treats the percentage character "%" as a wild card character and and OS/400 use the asterisk character "*" as a wild card character.

SQL keywords are also recognized during the qualifier substitution process. If after conditional text substitution, the string "ORDER BY" is not followed by any other text, it is removed. Also if after conditional text substitution, the string "GROUP BY" is followed by one of the following strings, it is removed: "HAVING", "UNION", ")", "ORDER BY". Conditional clauses after the "WHERE" or "HAVING" clause are handled in a special way. If the first clause is a conditional clause which is to be dropped and the following token is "AND" or "OR" the "AND" or "OR" is removed. If other conditional clauses are to be dropped then the preceding token (which is an "AND" or "OR") is also dropped. Also, if after conditional text substitution, the string "HAVING" is followed by one of the following strings, it is removed: "UNION", ")", "ORDER BY". Also, if after conditional , . text substitution, the string "WHERE" is followed by the string "GROUP BY", "HAVING", "UNION", or ")", "ORDER BY", it is removed.

When a single qualifier identifier 272 has multiple values 274 the conditional clause is repeated for each value with these clauses 276 ORed together (see 270). When multiple qualifier identifiers have multiple qualifier values 282, 283, the qualifier values are paired for each qualifier identifier (see 280). This pairing is based on the order in which the qualifiers are passed in the area of the TOOLIN structure which contains the passed argument names and values (referred to as the PQUAL structure). This means that when more than one qualifier identifier is to be substituted within a conditional clause, all such qualifier identifiers must have the same cardinality. If this is not true, the return code NO_VALUE_FOR_REQUIRED_PARM is returned.

SQL Generators are similar to Defined generators but the resulting text after substitution is executed at the relational database specified by the RDBNAME parameter (RDBNAME is always a required qualifier for SQL object generators). The RDBNAME qualifier can also be used as a qualifier for substitution. The first word of the SQL generator must be "SELECT". If not then the return code GENERATOR_FAILED is returned. The generation specification text string itself (after substitutions) is not returned to the caller. Instead, the results of the SQL operation are formatted into the appropriate data structure and returned to the caller.

Example of SQL generators can be explained with reference to FIGS. 8 and 9.

Figure 8:
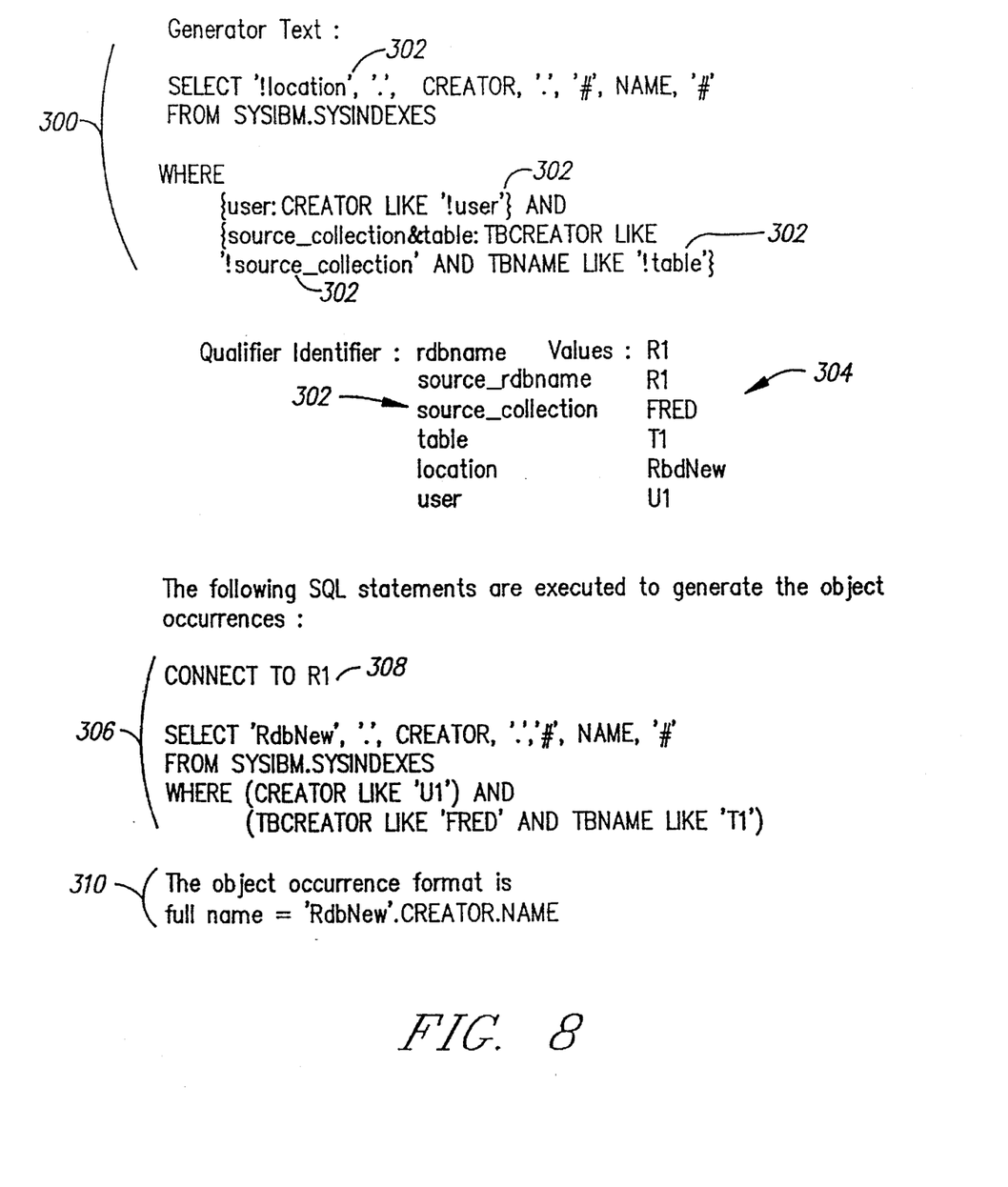
FIGS. 8 and 9 are examples of SQL generation specifications.

Referring to FIG. 8, the generation specification text 300 contains qualifier identifiers 302. The qualifier identifiers 302 are assigned values 304 provided by the requester. The substitutions are made to produce the SQL statement 306 executed to generate the object occurrences in the relational database specified 308. The execution of the SQL generator returns the object occurrence in the objects format 310.

Figure 9:
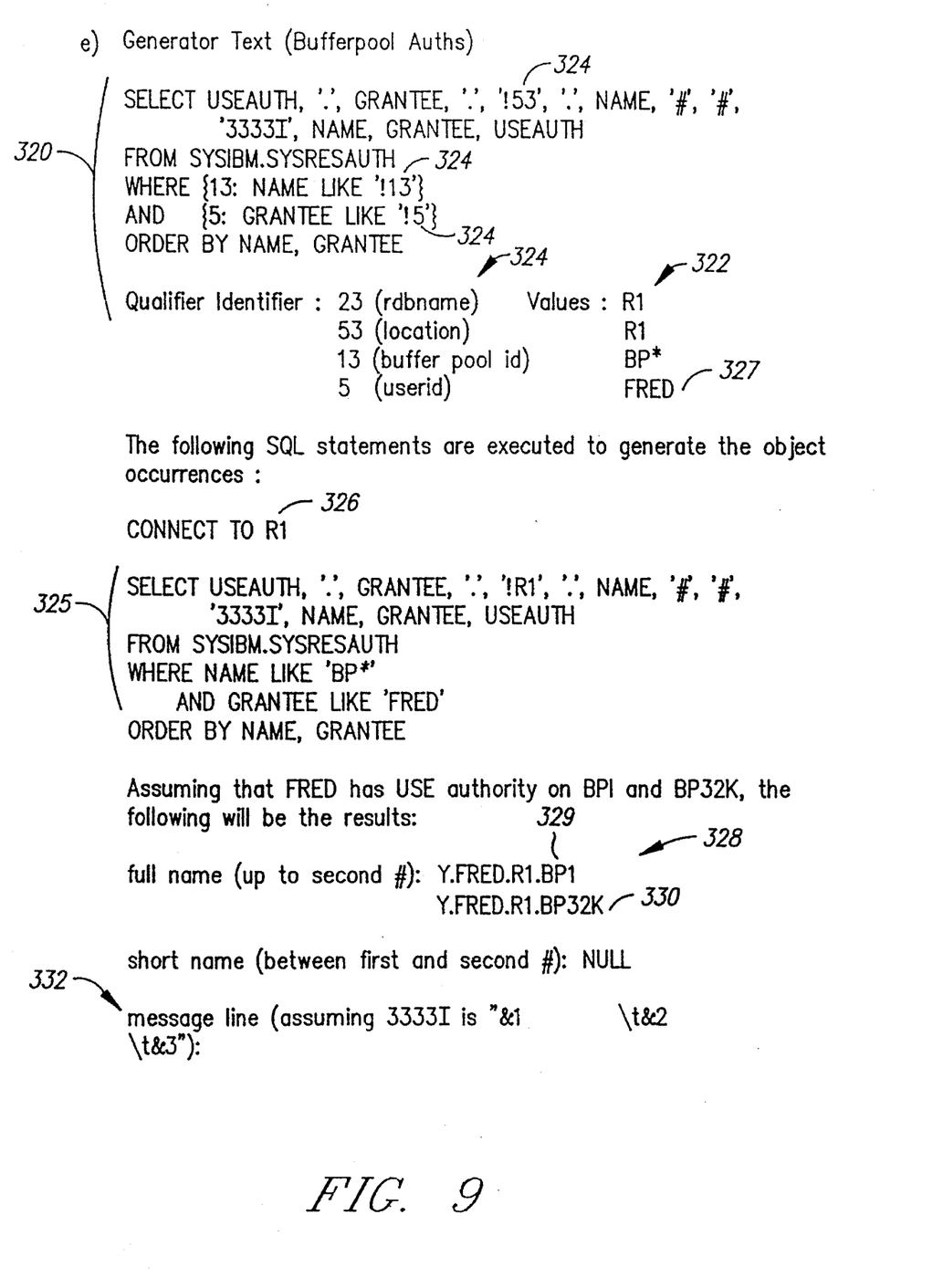

Referring to FIG. 9, buffer pool authorizations for a user ID is the object to be generated. The object identifier for that object is used to find the entry in the Object Generator table for the generator type which is SQL. The location specified along with the object identifier is used to find the valid generation specification 320 to generate the object. The requester also supplies the qualifier values 322 needed for the qualifier identifiers 324 in the generation specification text 320. The qualifiers 324 are the RDB name, the location, the bufferpool ID, and the user ID. The SQL statement 324 resulting from the qualifier substitutions to the generation specification 320 is executed in the "R1" RDB 326. The qualifier substitution values provide that the object generated 328 is that the user ID "FRED" 327 has authority for buffers BP1 329 and BP32K 330 in RDB R1. The SQL generator needed to make an assumption about a parameter which is relayed to the requester as a message 332.

The generators are thus used to generate a wide range of objects used by programs for maintaining a distributed database system, such as lists of User IDs, status of programs, and lists of host systems. Using the object generator routines, a programmer does not have to be familiar with each systems operating system or each DBMS. Moreover, the generation process does not have to be changed to add new types of objects or even new ways of generating objects. The Object Generator Table is changed, but the logic for using the generators is unchanged. Additionally, the program used to generate one object can also be used to generate other objects by altering the qualifier substitutions. The fact that the logic for materializing the objects is not part of the object definition, provides added flexibility.

While the invention has been particularly shown and described with reference to a preferred embodiment thereof, it will be understood by those skilled in the art that various other changes in the form and details may be made therein without departing from the spirit and scope of the invention. Accordingly, the method and system herein disclosed are to be considered merely as illustrative and the invention is to be limited only as specified in the claims.

We claim:

1. In a data processing system comprising a central processing unit (CPU), memory, and a plurality of database management systems (DBMSs) each associated with at least one database stored in the memory, wherein at least one DBMS is different from at least one other DBMS, a computerized method for the generation of objects in a standardized format comprising the steps of:

(a) associating a unique object identifier with each of the plurality of objects;

(b) storing in a table in a computer memory each unique object identifier in association with at least one object location type or instance corresponding to a particular database instance, an object generation specification for each object location type or instance, and a generation specification type, wherein said object generation specification for each object location type or instance specifies how an object is to be generated from said particular database instance;

(c) for a requested object and a specified database, identifying from the table in the computer memory, an object generation specification, and a generation specification type; and (d) generating in a standardized format the requested object from the specified database using the identified generation specification type and the identified object generation specification.

2. The method of claim 1 wherein the object generation specification contains at least one qualifier identifier and requester supplied qualifier values are substituted for each qualifier identifier.

3. The method of claim 1 wherein the requested object is the object generation specification having a requester supplied qualifier value substituted for each qualifier identifier in the object generation specification.

4. The method of claim 1 wherein the object is a result of the object generation specification, having a requester supplied qualifier value substituted for each qualifier identifier in the object generation specification, executed as an SQL statement by a DBMS.

5. The method of claim 1 wherein the object is a result of the object generation specification executed as a program by a CPU with a requester supplied qualifier value substituted for each qualifier identifier program parameter.

6. The method of claim 1 wherein the standardized format comprises a pointer to the requested object with an indicator of the size of the requested object.

7. The method of claim 1 wherein each unique object identifier is stored in a set of at least one table in association with at least one object location, an object generation specification for each object location, and a generation specification type.

8. The method of claim 7 further comprising the step of adding a new object identifier and associated information to the set of at least one table.

9. In a distributed data processing system having a plurality of different computer systems, each system having a central processing unit (CPU), memory, a database stored in the memory, and a DBMS, a system for the generation of objects in a standardized format from each of the computer systems, comprising:

means for associating a unique object identifier with each of the plurality of objects;

means for storing in a table in a computer memory each unique object identifier in association with at least one object location type or instance, an object generation specification for each object location type or instance, and a specification type wherein said object generation specification for an object location type or instance specifies how object is to be generated from a particular computer system;

means for identifying from the table in the computer memory, an object generation specification, and a generation specification type; and means for generating in a standardized format information about the requested object using the identified generation specification type and the identified object generation specification.

10. The system of claim 9 wherein the object generation specification contains at least one qualifier identifier and requester supplied qualifier values are substituted for each qualifier identifier.

11. The system of claim 9 wherein the requested object is the object generation specification having a requester supplied qualifier value substituted for each qualifier identifier in the object generation specification.

12. The system of claim 9 wherein the object is the result of the object generation specification, having a requester supplied qualifier value substituted for each qualifier identifier in the object generation specification, executed as an SQL statement by a DBMS.

13. The system of claim 9 wherein the object is the result of the object generation specification executed as a program by a CPU with a requester supplied qualifier value substituted for each qualifier identifier program parameter.

14. In a data processing system comprising at least one database and a plurality of database management systems, a method for the generation of an object in a standardized format, comprising the steps of:

assigning an object identifier to the object;

creating a generation specification for the object, indicating how the object is to be generated for a particular system;

storing in a table in a memory said object identifier and said generation specification; and generating information about the object for said particular system in a standardized format using said stored generation specification.

15. The method of claim 14, further comprising the step of storing a generation specification type indicating a type of said generation specification used to generate the object.

16. The method of claim 14, further comprising the steps of:

receiving from a routine a request to generate the object, wherein said request identifies the object by said object identifier and identifies a particular system; and retrieving from said table said generation specification associated with the requested object for said identified system.

17. The method of claim 16, wherein said step of receiving comprises the step of receiving qualifter values from said routine and said step of generating comprises the step of substituting said qualifter values into said generation specification to produce an SQL statement.

18. The method of claim 16, wherein said step of receiving comprises the step of receiving qualifter values from said routine and said step of generating comprises the step of substituting said qualifter values into said generation specification to produce the object.

\* \* \* \* \*